UNITED STATES PATENT OFFICE

WALTER V. WIRTH, OF MILWAUKEE, WISCONSIN, ASSIGNOR TO E. I. DU PONT DE NEMOURS & COMPANY, OF WILMINGTON, DELAWARE, A CORPORATION OF DELAWARE

PROCESS FOR THE MANUFACTURE OF PHOSPHORUS PENTACHLORIDE

No Drawing.    Application filed November 27, 1931.    Serial No. 577,711.

This invention relates to a process for the manufacture of phosphorus pentachloride. More particularly, it relates to a process for manufacturing phosphorus pentachloride in a form particularly adapted for use in the preparation of organic acyl chlorides.

Organic acyl chlorides have generally been prepared in the art by reacting the corresponding carboxylic acid with phosphorus pentachloride, in accordance with the following equation:

$$R-COOH + PCl_5 \rightarrow R-CO.Cl + POCl_3 + HCl$$

(R = an organic residue).

This method, however, was objectionable on account of the difficult handling of phosphorus pentachloride and the violence of the reaction.

Accordingly, in U. S. Patent 1,359,071, a method of manufacturing acyl-chlorides was proposed wherein the phosphorus pentachloride required is produced in situ during the reaction. Instead of starting with an organic acid and phosphorus pentachloride, this patent proposes to mix the organic acid with phosphorus trichloride, and then pass in chlorine gas, which apparently reacts first with the phosphorus trichloride to produce phosphorus pentachloride, while the latter immediately reacts with the organic acid to convert the same into the corresponding acyl-chloride. The summarized equation for the reaction is:

$$PCl_3 + R-COOH + Cl_2 \rightarrow R-COCl + POCl_3 + HCl$$

Now, the above process suffers from the objection that in many cases, particularly in the case of aroyl acids, the phosphorus pentachloride is produced too suddenly and in too high concentration. If the chlorine is fed into the body of the liquid mixture through a nozzle, solid phosphorus pentachloride forms at once a hard, rocky incrustation at the mouth of the nozzle, thereby impeding further progress of the reaction. Accordingly, in practice the chlorine must be blown over the surface of the liquid, thereby limiting the reaction zone to the surface of the liquid, and thus necessarily decreasing the rate and efficiency of the reaction and increasing the cost of the product.

It is accordingly an object of this invention to produce phosphorus pentachloride in finely divided form, suspended in a liquid medium, and adapted for immediate use in reactions requiring phosphorus pentachloride.

It is a further object of this invention to produce phosphorus pentachloride in such a physical form and suspended in such a liquid medium as to be particularly adapted to the manufacture of organic acyl-chlorides from the corresponding carboxylic acids.

Other and further important objects of this invention will appear as the description proceeds.

In my improved process, I select as initial material either phosphorus or phosphorus trichloride. I suspend or dissolve this material in phosphorus oxychloride, and pass chlorine into the mixture. The quantity of phosphorus oxychloride used for this purpose is preferably several times the weight of the phosphorus or phosphorus trichloride used. In the case where elemental phosphorus is used, the chlorine reacts therewith first to produce the trichloride which dissolves in the oxychloride. In either case the trichloride, thus produced or initially added, reacts with a further quantity of chlorine to produce the pentachloride $$PCl_3 + Cl_2 \rightarrow PCl_5.$$

The oxychloride present is inert toward chlorine. But its presence, I found, is highly beneficial, in that it prevents the pentachloride from being formed in compact, rocky form. Instead, the pentachloride is produced in very finely divided form, and may be distributed readily throughout the oxychloride mass by mechanical agitation. When the theoretical quantity of chlorine has been absorbed, the mixture consists substantially of phosphorus pentachloride suspended in phosphorus oxychloride. Excess of chlorine does not materially affect the composition of the mixture, since both the pentachloride and oxychloride are inert toward chlorine.

This mixture is particularly suitable for the manufacture of acyl chlorides from the corresponding carboxylic acids. When an organic acid is added to this mixture, reaction takes place in the usual manner, except that the reaction zone is distributed practically throughout the liquid mass, and is further facilitated by the fine form of the phosphorus pentachloride.

Since phosphorus oxychloride is produced as a by-product in the formation of acyl-chlorides, its introduction at the beginning of the process does not complicate the latter by any special recovery or separation steps. On the contrary, the process is considerably simplified, for instead of effecting a complete separation of the organic acyl chloride from the phosphorus oxychloride in the final product, it is sufficient in my process to separate the reaction mass by distillation into three fractions. The two extreme fractions contain substantially pure acyl-chloride and phosphorus oxychloride, respectively, while the middle fraction containing a mixture of the two may be used directly as suspending medium for the next batch of reactants, and therefore need not be further separated.

Although in the above discussion I illustrated my invention as applied to the manufacture of organic acyl-chlorides, it will be understood that my invention is applicable to other processes requiring phosphorus pentachloride, particularly where phosphorus oxychloride is produced in the reaction either as main product or by-product. As examples of such other processes may be mentioned the manufacture of organic sulfone chlorides from the corresponding sulfonic acids, the manufacture of thionyl chloride from sulfur dioxide, or the manufacture of phosphorus oxychloride itself from phosphorus pentachloride and water.

Without limiting my invention to any particular procedure, the following examples are given to illustrate my preferred mode of operation. Parts given are parts by weight.

Example 1

62 parts of yellow phosphorus are charged into 337 parts of phosphorus oxychloride and the mixture is warmed up to melt the phosphorus. Chlorine gas is now passed into the mixture, while keeping down the temperature, by the aid of cooling, at below 40° to 45° C. The reaction is complete when about 360 parts of chlorine have been absorbed. At this point the mass turns yellow and consists of a rather dense suspension of fine crystals of phosphorus pentachloride in liquid phosphorus oxychloride. The yield is practically quantitative.

The above suspension is exceptionally well adapted to the manufacture of organic acyl chlorides. If water is added to said suspension it is converted, practically completely, into phosphorus oxychloride and hydrochloric acid.

$$PCl_5 + H_2O = POCl_3 + 2HCl$$

Example 2

220 parts of phosphorus trichloride and 550 parts of phosphorus oxychloride are charged into a flask, and chlorine gas is conducted through the solution until about 114 parts have been absorbed. During this procedure the temperature of the mixture is kept down below 60° C., by external cooling. When the reaction is complete the mass is cooled to room temperature, and consists of a suspension of finely divided, crystalline, phosphorus pentachloride in phosphorus oxychloride.

The above mixture, in view of the finely divided form of the phosphorus pentachloride, and in view of the nature of the diluent, is particularly suitable for the manufacture of acyl chlorides, as illustrated by the following example.

Example 3

Into the cooled suspension of phosphorus pentachloride in phosphorus oxychloride as obtained in Example 2, there are stirred in 254 parts of p-nitro-benzoic acid. The temperature rises very little, but as reaction proceeds, the benzoic acid body goes into solution. When reaction is complete, the mass is distilled at a temperature gradually raised to 180° C. Most of the phosphorus oxychloride (about 728 parts) distils over during this period. Application of a vacuum of 20 inches now brings over 48 parts more of phosphorus oxychloride. The undistilled residue consists of p-nitro-benzoyl chloride, in admixture with some residual phosphorus oxychloride. It may be subjected to redistillation under vacuum, but ordinarily it is sufficiently pure for technical application without further purification.

In the case of acyl chlorides whose boiling point is close to that of phosphorus oxychloride, the distillation may be carried out in the following manner. At first the distillate consisting of but a single component is condensed. This may be pure oxy-chloride or pure acyl-chloride, depending on the boiling point of the latter. The next fraction containing a mixture of both acyl chloride and phosphorus oxychloride is collected and condensed in a separate vessel. The distillation is continued until the residue in the still consists of the substantially pure second component.

The middle fraction containing both acyl chloride and phosphorus oxychloride may be used directly as diluent for the preparation of the next batch of phosphorus pentachloride according to Examples 1 or 2, and the mixture thus produced may be used for the production of further quantities of acyl chloride in accordance with Example 3. The cycle may be repeated indefinitely.

It will be understood that my preferred process is susceptible to many variations and modifications without departing from the spirit of this invention.

I claim:

1. The process of producing phosphorus pentachloride in finely divided form which comprises reacting with chlorine upon phosphorus trichloride in phosphorus oxychloride solution.

2. The process of producing phosphorus pentachloride in finely divided form which comprises preparing a solution of phosphorus trichloride in phosphorus oxychloride, and passing chlorine gas into this solution.

3. The process of producing phosphorus pentachloride in finely divided form which comprises suspending phosphorus in phosphorus oxychloride, and passing in chlorine gas in a quantity sufficient to produce first the trichloride and then the pentachloride of phosphorus.

4. The process of producing phosphorus pentachloride in finely divided form which comprises passing in substantially 360 parts of chlorine gas into a mixture of substantially 62 parts of phosphorus in 337 parts of phosphorus oxychloride maintained at a temperature below 45° C.

5. The process of producing phosphorus pentachloride in finely divided form which comprises passing in substantially 114 parts of chlorine into a solution of substantially 220 parts of phosphorus trichloride in 550 parts of phosphorus oxychloride while maintaining the temperature of the mass at below 60° C.

6. The process of producing phosphorus pentachloride in finely divided form which comprises suspending phosphorus in phosphorus oxychloride, and passing in chlorine gas in a quantity sufficient to convert the phosphorus substantially completely into phosphorus pentachloride.

In testimony whereof I affix my signature.

WALTER V. WIRTH.